United States Patent
Neadle et al.

(10) Patent No.: US 7,682,019 B2
(45) Date of Patent: Mar. 23, 2010

(54) METHODS FOR ROTATIONALLY STABILIZING CONTACT LENSES

(75) Inventors: Susan W. Neadle, Jacksonville, FL (US); Sheila B. Hickson-Curran, Ponte Vedra Beach, FL (US); Philippe F. Jubin, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 11/679,881

(22) Filed: Feb. 28, 2007

(65) Prior Publication Data

US 2007/0139610 A1   Jun. 21, 2007

Related U.S. Application Data

(62) Division of application No. 10/849,710, filed on May 20, 2004, now Pat. No. 7,201,480.

(51) Int. Cl.
*G02C 7/04* (2006.01)
*G02C 7/02* (2006.01)

(52) U.S. Cl. .............................. 351/160 H; 351/160 R; 351/159

(58) Field of Classification Search ............. 351/160 R, 351/161, 160 H
See application file for complete search history.

(56) References Cited

U.S. PATENT DOCUMENTS

| | | | | |
|---|---|---|---|---|
| 2,347,488 A | * | 4/1944 | Lawior et al. | 351/160 R |
| 4,618,228 A | * | 10/1986 | Baron et al. | 351/161 |
| 4,859,049 A | * | 8/1989 | Muller | 351/161 |
| 5,020,898 A | * | 6/1991 | Townsley | 351/160 R |
| 5,606,378 A | * | 2/1997 | Van Meurs | 351/161 |

\* cited by examiner

*Primary Examiner*—Joseph Martinez
*Assistant Examiner*—James R Greece

(57) ABSTRACT

The invention provides contact lenses which have improved dynamic stabilization and that utilize one or more thin zones in the lens' periphery.

1 Claim, 5 Drawing Sheets

METHODS FOR ROTATIONALLY STABILIZING CONTACT LENSES

FIELD OF THE INVENTION

The application is a division of U.S. Ser. No. 10/849,710 filed on May 20, 2004 now U.S. Pat. No. 7,201,480. The invention relates to contact lenses. In particular, the invention provides improved methods for rotationally stabilizing contact lenses using dual thin zone designs.

BACKGROUND OF THE INVENTION

It is known that correction of certain optical defects can be accomplished by imparting non-spherical corrective characteristics to one or more surfaces of a contact lens such as one or more of cylindrical, bifocal, or multifocal characteristics. The use of these lenses is problematic in that the lens must be maintained at a specific orientation while on eye to be effective yet, once the lens is on-eye, it will rotate on the eye due to blinking as well as eyelid and tear fluid movement.

Maintenance of the on-eye orientation of a lens typically is accomplished by altering the mechanical characteristics of the lens. For example, prism stabilization, including without limitation decentering of the lens' front surface relative to the back surface, prismatic balancing, thickening of the lower lens edge, supporting the lens on the lower eyelid, forming depressions or elevations on the lens' surface, and truncating the lens edge, has been used.

Additionally, dynamic stabilization methods are known including dual thin zone designs. In dual thin zone designs, the lens is stabilized by reducing the thickness in certain areas of the lens' front, or object side, surface. More specifically, thin zones are provided at each of two symmetrically lying regions along the 90-270 degree axis on the lens' front surface periphery. In addition to the thin zones, two thickened regions form the remainder of the lens' periphery and are present along the horizontal, or 0-180 degree axis.

The dual thin zone design is disadvantageous because it is prone to excessive rotation when placed on the eye, which complicates fitting of the lens. Additionally, the design is unpredictable as to on eye rotation because the rotation varies with variations in eye shape, lid geometries, and the lens wearer's blinking. This also complicates, or makes impossible, fitting of the lens. Thus, there is a need for dual thin zone designs that overcome some of these disadvantages.

DETAILED DESCRIPTION OF THE INVENTION AND PREFERRED EMBODIMENTS

The invention provides contact lenses, and methods for producing contact lenses, which have improved dynamic stabilization and that utilize one or more thin zones in the lens' periphery.

Figure 1:
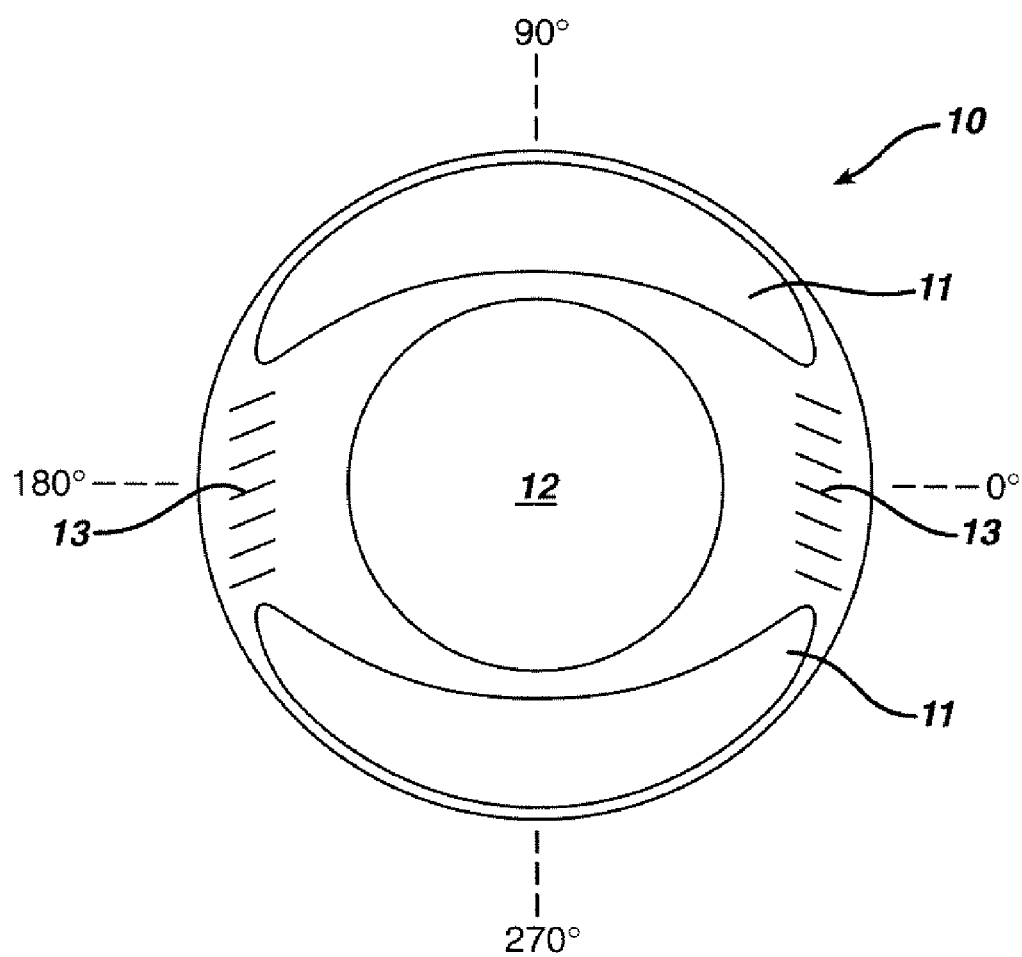
FIG. 1 is a plan view of the front surface of a prior art lens.

In FIG. 1 is shown the front surface of prior art contact lens 10, which lens incorporates a known, dual thin zone design. As shown in FIG. 1, lens 10 has two thin zones 11, one superior and one inferior, lying at opposite ends of the 90-270 degree axis. These thin zones lie in the periphery, or non-optical portion, of the lens lying adjacent to and surrounding optic zone 12. The lens periphery excludes the lens edge, or outermost portion of the lens relative to its geometric center. Typically, the lens edge is about 0.02 mm to about 0.2 mm in width. Additionally, as shown in FIG. 1, thickened areas 13 lie along the horizontal axis in the lens periphery, one each at opposite ends of the 0-180 degree axis. Thickened areas 13 may assume any convenient shape as, for example, an elongated rectangular shape. Both the superiorly and inferiorly located thin zones of such a lens assume an arc-shape wherein the radius of the arc is directed towards the outside edge of the lens and the apex of the arc is directed towards the geometric center of the lens.

It is a discovery of the invention that, by providing thin zones shaped so that the shape capitalizes on the interaction between the lens and the eyelid, lens stabilization is achieved. More specifically, in one embodiment the invention provides a lens the front surface of which comprises, consists essentially of, or consists of at least one thin zone having a convex outer edge, a shoulder that is integral with and extending inwardly from either end of the outermost edge, an inwardly tapering edge continuous with the shoulder and extending inwardly therefrom and an edge integral with and extending between the inwardly tapering edges. By a "thin zone" is meant that the lens thickness, as measured between the front, or object side, surface and back, or eye side, surface of the lens, within the thin zones is less than that of the lens periphery that is outside of the thin zone.

Figure 2:
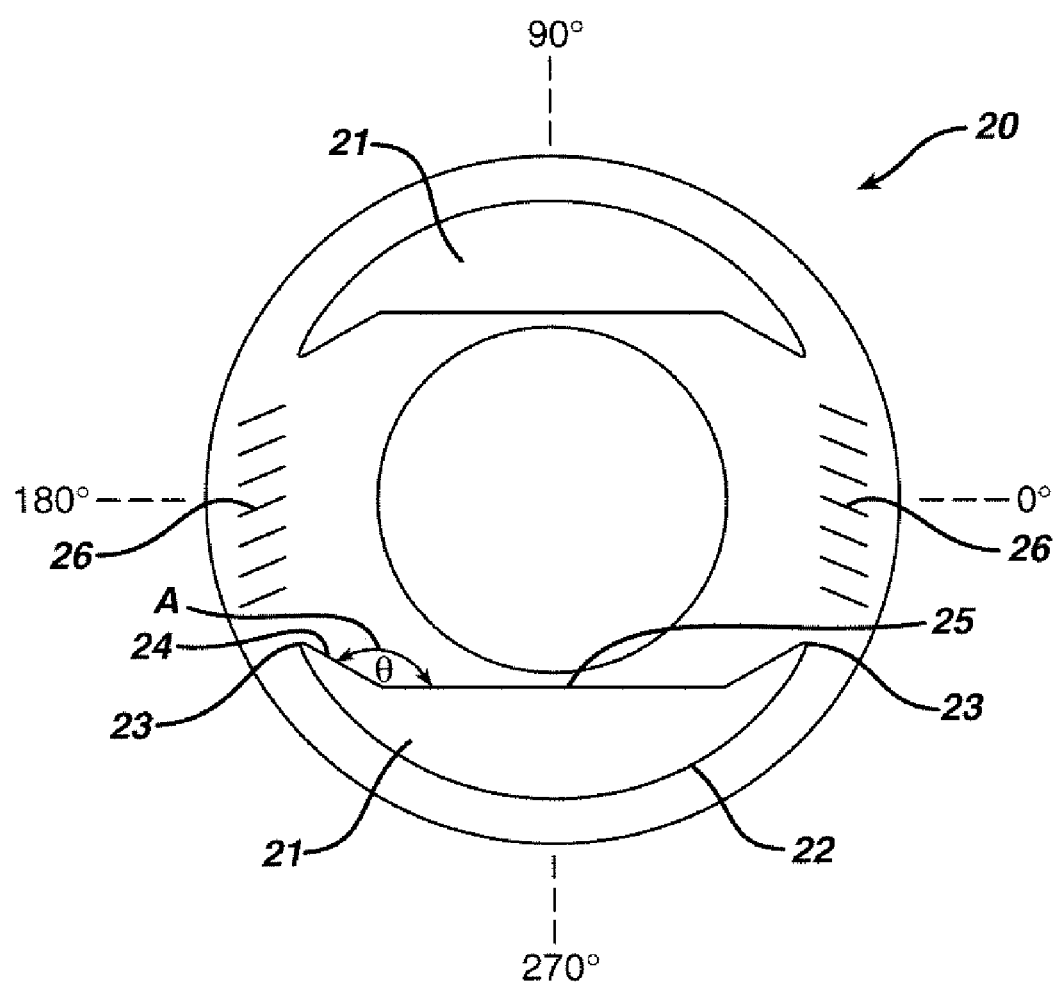
FIG. 2 is a plan view of the front surface of a lens depicting one embodiment of the invention.

In FIG. 2 is depicted lens 20, one embodiment of the invention, with two thin zones 21 in the lens' periphery. Each zone 21 has a convex edge 22 that is the outermost boundary of the thin zones in relation to the optic zone of the lens. The innermost boundary of the thin zone is formed by shoulders 23, inwardly tapering edges 24 and edge 25. Each shoulder 23 is integral with and extends inwardly from each end of convex edge 22. Each of the inwardly tapering edges 24 is continuous with a shoulder 23 and edge 25 extending therebetween. Convex edge 22 may have any convenient curvature. Preferably, the curvature of convex edge 22 is such that a radius consistent with the wearer's lower eyelid position and geometry is used. More preferably, the radius of curvature of convex edge 22 ranges from about 3.5 to about 10.5 mm. Inwardly tapering edge 23 can form an angle in the range of about 0 to about 270 degrees relative to edge 25 and preferably forms an angle of about 0 to about 90 degrees. In the lens periphery and symmetrical about each end of the 0-180 degree axis are thick zones 26. By a "thick zone" is meant that the lens thickness, as measured between the front, or object side, surface and back, or eye side, surface of the lens, within the thick zone is greater than that of the lens periphery that is outside of the thick zone.

Figure 3:
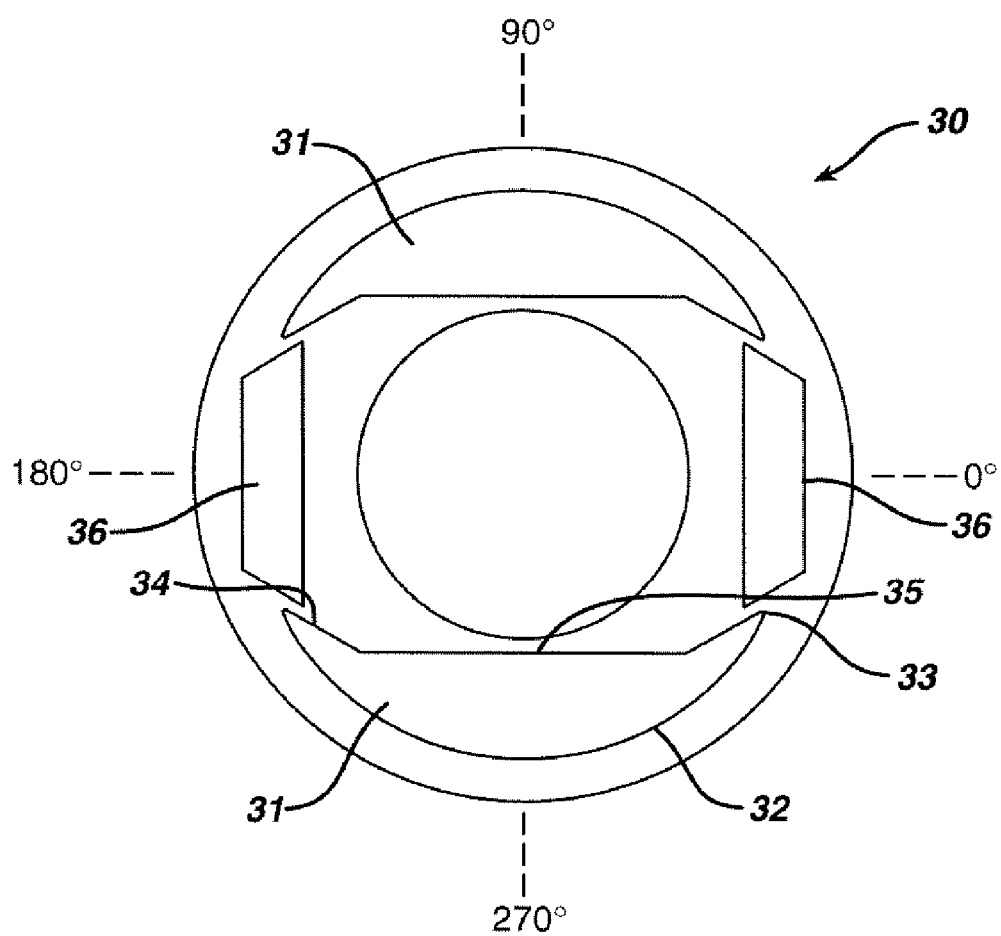
FIG. 3 is a plan view of the front surface of a lens depicting a second embodiment of the invention.
Figure 4:
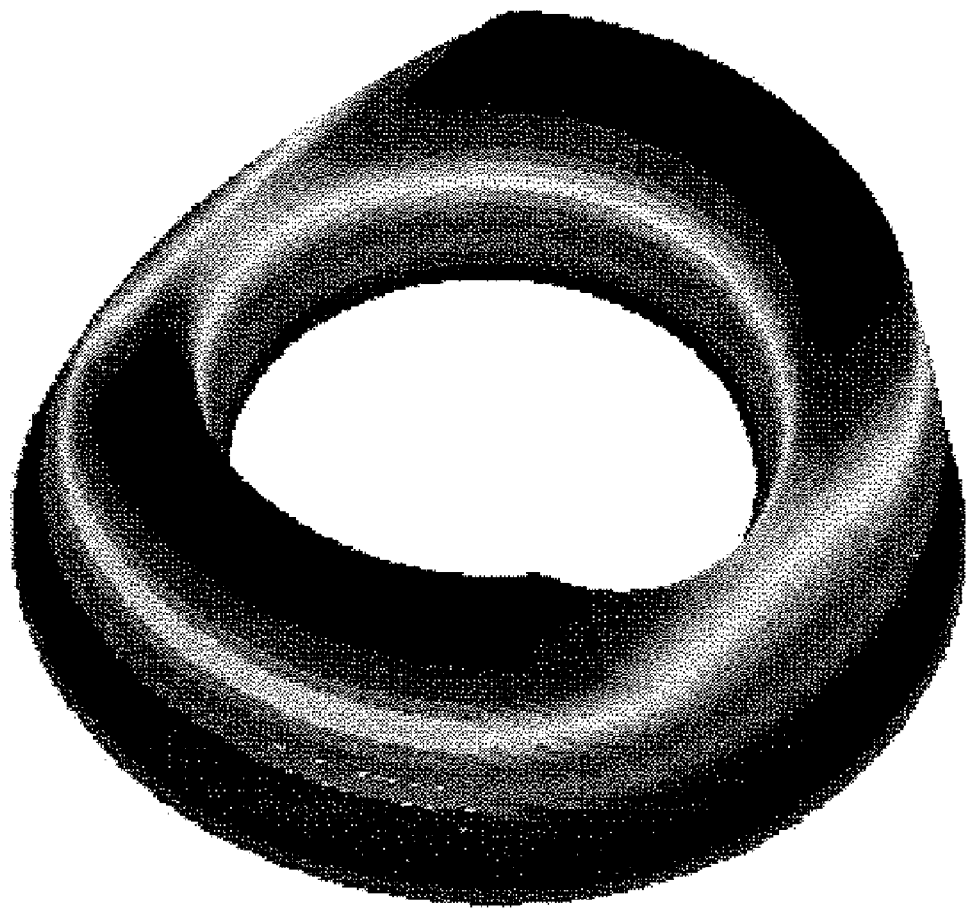
FIG. 4 is a three-dimensional, graphical depiction of a profile view of the lens of FIG. 3.

In FIG. 3 is depicted lens 30, an alternative embodiment of the invention. Lens 30 has two thin zones 31, each of which has an outermost convex edge 32, shoulders 33, inwardly tapering edges 34, and edge 35. Additionally, in the lens periphery and symmetrical about the 0-180 degree axis of the lens are thick zones 36. As depicted, and preferably, thick zones 36 assume a trapezoidal shape that is three-dimensional on vertical cross-section, as shown in FIG. 4.

As yet another embodiment, a lens may be provided that has a thin zone in the lower portion of the lens periphery symmetrical about the 270 degree location as depicted in either FIG. 2 or 3. A second thin zone is symmetrical about the 90 degree location on the lens periphery, which second thin zone is composed of a plurality of iso-thickness lines. By "iso-thickness line" is meant that, at any point along the line, the thickness is the same at any other point along the line. The thickness within the thin zone changes continuously as one moves from one iso-thickness line to another and increases in thickness as one moves inwardly from the outermost region of the thin zone toward the innermost region of the thin zone. In yet another embodiment, a thin zone is provided in the lower portion of the lens periphery symmetrical about the 270 degree locations as depicted in either FIG. 2 or 3 along with an iso-thickness thin zone at the 90 degree location and thick zones symmetrical about 0 and 180 degrees. Preferably, the thick zones are a trapezoid shape that is three-dimensional on vertical cross-section.

Figure 5:
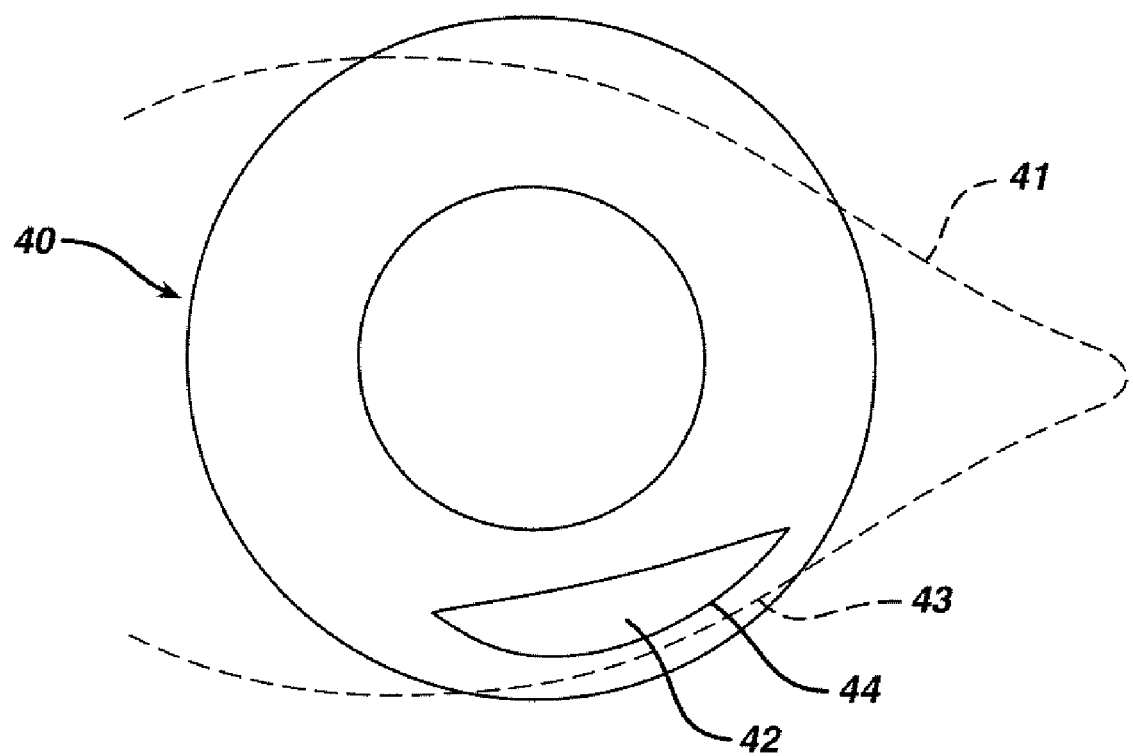
FIG. 5 is a plan view of the front surface of a lens depicting a third embodiment of the invention.

As yet another alternative for achieving improved dynamic stability, a lens may include one or more thin zones the shape of which incorporates the lower lid profile. It is a discovery of the invention that by configuring the contour of one or more thin zones in the inferior portion of the lens to substantially correspond to the contour of the eyelid, improved stabilization may be achieved. The improved stabilization is a result of greater interaction of the eyelid with the thin zone. In FIG. 5 is depicted lens 40. Dotted line 41 depicts the upper eyelid and dotted line 43 depicts the lower eyelid. Thin zone 42 is contoured so that its outermost edge 44 corresponds to the contour of lower eyelid 43. Preferably, thin zone 42 is not centered about the 270 degree point on the lens periphery as is the inferior thin zone of the other thin zone designs.

In order to determine the configuration of the thin zones in the lens of this embodiment, the lens wearer's eye must first be observed during the blink cycle to determine which eyelid predominates in moving the lens on the eye. For example, in the case in which the upper eyelid predominates, meaning that the upper lid is driving the lens movement on eye, the lens design will be thinned closer to the outermost portion of the periphery of the lens to minimize interaction with the upper lid when the lens is in an oriented position. The observation may be carried our using high-speed video recording equipment. The motion of the eyelid is recorded during he blink cycle and then measured. Specifically, the angle at which the eyelid contacts the thin zone is imaged and measured along with one or more of lid angles during primary gaze, lid angles during blink, vertical or angular movement of the lens, and displacement of the inner or outer canthus. As yet another embodiment of the invention, the common eyelid contours for a population may be determined and thin zone designs based on the most common contours may be incorporated into a lens.

The lenses of the invention may be manufactured using known methods. Depending on the degree of asymmetry of the design, such as in the third embodiment of the invention, mold inserts and mold may be designed by known methods to ensure the finished, hydrated lens contains the desired geometry.

The stabilization designs of the invention may be used in any contact lens, but will find their greatest utility in lenses requiring on-eye stabilization. Such lenses include, without limitation, bifocal, progressive, and toric lenses. Additionally, the designs may be useful in lenses customized to a specific individual's corneal topography, lenses incorporating high order wave-front aberration, or both.

The lenses of the invention may be made from any suitable lens forming material for manufacturing hard or soft contact lenses. Illustrative materials for formation of soft contact lenses include, without limitation, silicone elastomers, silicone-containing macromers including, without limitation, those disclosed in U.S. Pat. Nos. 5,371,147, 5,314,960, and 5,057,578 incorporated in their entireties by reference, hydrogels, silicone-containing hydrogels, and the like and combinations thereof. More preferably, the surface is a siloxane, or contains a siloxane functionality including, without limitation, polydimethyl siloxane macromers, methacryloxypropyl siloxanes, and mixtures thereof, silicone hydrogel or a hydrogel. Illustrative materials include, without limitation, acquafilcon, etafilcon, genfilcon, lenefilcon, senefilcon, balafilcon, lotrafilcon, or galyfilcon.

A preferred contact lens material is poly 2-hydroxyethyl methacrylate polymers having a peak molecular weight between about 25,000 and about 80,000 and a polydispersity of less than about 1.5 to less than about 3.5, respectively, and covalently bonded thereon, at least one crosslinkable functional group. This material is described in U.S. Ser. No. 60/363,630 incorporated herein in its entirety by reference.

Curing of the lens material may be carried out by any convenient method. For example, the material may be deposited within a mold and cured by thermal, irradiation, chemical, electromagnetic radiation curing and the like and combinations thereof. Preferably, molding is carried out using ultraviolet light or using the full spectrum of visible light. More specifically, the precise conditions suitable for curing the lens material will depend on the material selected and the lens to be formed. Suitable processes are disclosed in U.S. Pat. Nos. 4,495,313, 4,680,336, 4,889,664, 5,039,459, and 5,540,410 incorporated herein in their entireties by reference.

The contact lenses of the invention may be formed by any convenient method. One such method uses a lathe to produce mold inserts. The mold inserts in turn are used to form molds. Subsequently, a suitable lens material is placed between the molds followed by compression and curing of the resin to form the lenses of the invention. One ordinarily skilled in the art will recognize that any other number of known methods may be used to produce the lenses of the invention.

What is claimed is:

1. A contact lens, comprising at least one thin zone in a lens periphery, the thin zone having a convex edge that is the outermost boundary of the optic zone of the lens and an innermost boundary of the thin zone formed by the shoulder and inwardly tapering ends wherein said lens has a circular or oval shape, the radius of the convex edge is consistent with the eyelid of a wearer of said lens, said convex edge is contoured so that the outermost edge corresponds to the contour of an eyelid and said thin zone is not centered about the vertical axis of the lens.

* * * * *